(12) United States Patent
Aliferis et al.

(10) Patent No.: US 10,289,751 B2
(45) Date of Patent: May 14, 2019

(54) DATA ANALYSIS COMPUTER SYSTEM AND METHOD EMPLOYING LOCAL TO GLOBAL CAUSAL DISCOVERY

(71) Applicants: Konstantinos (Constantin) F. Aliferis, Astoria, NY (US); Alexander Statnikov, New York, NY (US)

(72) Inventors: Konstantinos (Constantin) F. Aliferis, Astoria, NY (US); Alexander Statnikov, New York, NY (US)

( * ) Notice: Subject to any disclaimer, the term of this patent is extended or adjusted under 35 U.S.C. 154(b) by 236 days.

(21) Appl. No.: 14/215,820

(22) Filed: Mar. 17, 2014

(65) Prior Publication Data
US 2014/0280361 A1 Sep. 18, 2014

Related U.S. Application Data

(60) Provisional application No. 61/798,264, filed on Mar. 15, 2013.

(51) Int. Cl.
*G06F 17/30* (2006.01)

(52) U.S. Cl.
CPC .. *G06F 17/30958* (2013.01); *G06F 17/30587* (2013.01)

(58) Field of Classification Search
CPC .............. G06F 17/30958; G06F 17/30587
USPC .................................................. 707/798, 688
See application file for complete search history.

(56) References Cited

U.S. PATENT DOCUMENTS

| | | | | |
|---|---|---|---|---|
| 7,117,185 B1* | 10/2006 | Aliferis | ............... | G06K 9/6296 706/12 |
| 7,610,367 B2* | 10/2009 | Canright | ................. | H04L 41/12 709/223 |
| 7,889,679 B2* | 2/2011 | Canright | ................. | H04L 41/22 370/252 |
| 7,912,698 B2* | 3/2011 | Statnikov | ............... | G06F 19/24 704/257 |
| 8,543,690 B1* | 9/2013 | Zeitoun | ................. | H04L 41/145 370/230.1 |
| 9,746,985 B1* | 8/2017 | Humayun | ............... | G06Q 10/10 |
| 2005/0027480 A1* | 2/2005 | Qiao | ................... | G06F 11/2257 702/183 |

(Continued)

OTHER PUBLICATIONS

Constantin F. Aliferis et al., "Local Causal and Markov Blanket Induction for Causal Discovery and Feature Selection for Classification Part I: Algorithms and Empirical Evaluation" Jan. 2010, The Journal of Machine Learning Research, vol. 11, Mar. 1, 2010 , pp. 171-234.*

(Continued)

*Primary Examiner* — Pierre M Vital
*Assistant Examiner* — Nargis Sultana
(74) *Attorney, Agent, or Firm* — Laurence Weinberger

(57) ABSTRACT

Discovery of causal networks is essential for understanding and manipulating complex systems in numerous data analysis application domains. Several methods have been proposed in the last two decades for solving this problem. The inventive method uses local causal discovery methods for global causal network learning in a divide-and-conquer fashion. The usefulness of the invention is demonstrated in data capturing characteristics of several domains. The inventive method outputs more accurate networks compared to other discovery approaches.

5 Claims, 18 Drawing Sheets

---

LGL-OO Local-to-Global Learning Method with Optimal Order ( LGL with dynamic prioritization and interrupted local learning)

1. Find PC(X) for every variable X in data using GLL-PC with dynamic prioritization and without symmetry correction [13]:
   a. Order variables randomly
   b. Repeat
   c. - Start learning the local neighborhood for all variables in current order
      - Interrupt processing of a variable when a number of conditional independence tests equal to testnum has been completed for the variable or until GLL-PC terminates for that variable
      - When GLL-PC terminates or it is interrupted for a variable, share the membership results with all other variables (i.e., force strongly relevants in the Tentative PC set of the corresponding variables never allowing to be excluded thereafter and force identified weakly relevants and irrelevants out of the corresponding variables never to be considered again)
   d. For each variable X calculate a revised optimal priority score for X on the basis of (i) how fast GLL-PC is able to eliminate candidate causes and effects for X, (ii) CIT results for that variable as well as other variables in the dataset and (iii) the ability of X to eliminate other variables from tentative PC sets up to the point of interrupt.
   e. Re-rank unresolved variables (i.e. where GLL-PC has not terminated yet) using their R scores, from largest to smallest
   f. Until GLL-PC has terminated for all variables
2. Piece together the undirected skeleton from the local GLL-PC results.
3. Use any desired edge orientation scheme to orient edges.

(56) References Cited

U.S. PATENT DOCUMENTS

| | | | |
|---|---|---|---|
| 2007/0178473 A1* | 8/2007 | Chen | G06F 19/12 435/6.11 |
| 2007/0225956 A1* | 9/2007 | Pratt | G06F 19/12 703/11 |
| 2008/0208784 A1* | 8/2008 | Hill | G06F 19/12 706/46 |
| 2009/0150325 A1* | 6/2009 | De | G06N 7/005 706/52 |
| 2010/0121792 A1* | 5/2010 | Yang | G06F 17/30958 706/12 |
| 2010/0138026 A1* | 6/2010 | Kaushal | G05B 13/0265 700/104 |
| 2010/0198761 A1* | 8/2010 | Meng | G06N 7/005 706/12 |
| 2011/0184896 A1* | 7/2011 | Guyon | G06F 19/24 706/12 |
| 2011/0191141 A1* | 8/2011 | Thompson | G06Q 30/02 705/7.32 |
| 2011/0202322 A1* | 8/2011 | Statnikov | G06K 9/6297 703/2 |
| 2011/0231704 A1* | 9/2011 | Ge | G06F 11/0709 714/26 |
| 2011/0307437 A1* | 12/2011 | Aliferis | G06N 99/005 706/52 |
| 2012/0116850 A1* | 5/2012 | Abe | G06Q 10/0639 705/7.38 |
| 2013/0283241 A1* | 10/2013 | Krajec | G06F 11/3636 717/128 |
| 2014/0095425 A1* | 4/2014 | Sipple | G06N 7/005 706/52 |
| 2014/0279746 A1* | 9/2014 | De Bruin | A61B 5/00 706/12 |
| 2014/0279797 A1* | 9/2014 | Dang | G06N 5/025 706/47 |

OTHER PUBLICATIONS

Constantin F. Aliferis et al., "Local Causal and Markov Blanket Induction for Causal Discovery and Feature Selection for Classification Part II: Analysis and Extensions", Mar. 2010, The Journal of Machine Learning Research, vol. 11, Mar. 1, 2010 , pp. 235-284.*

Aliferis et al., "Local Causal and Markov Blanket Induction for Causal Discovery and Feature Selection for Classification Part I: Algorithms and Empirical Evaluation" published in the Journal of Machine Learning Research on Mar. 1, 2010 pp. 171-234.*

Aliferis et al., "Local Causal and Markov Blanket Induction for Causal Discovery and Feature Selection for Classification Part II: Analysis and Extensions" published in the Journal of Machine Learning Research on Mar. 1, 2010 pp. 235-284.*

Aliferis et al., "Local Causal and Markov Blanket Induction for Causal Discovery and Feature Selection for Classification Part I: Algorithms and Empirical Evaluation" published in the Journal of Machine Learning Research on Mar. 1, 2010 (Year: 2010).*

Aliferis et al., titled "Local Causal and Markov Blanket Induction for Causal Discovery and Feature Selection for Classification Part II : Analysis and Extensions" published in the Journal of Machine Learning Research on Mar. 1, 2010 pp. 235-284 (Year: 2010).*

C.F. Aliferis, I.Tsamardinos, and A. Statnikov. Hiton: A Novel Markov Blanket Algorithm for Optimal Variable Selection; AMIA Annu Symp Proc. v.2003; 2003: 21-25 PMID: 14728126.

* cited by examiner

General LGL (Local-to-Global) Learning Method

1. Find *PC(X)* for every variable *X* in the data using an admissible configuration of GLL-PC (with or without symmetry correction) [13] and prioritizing which variables to induce *PC(X)* for, according to a prioritization process.
2. Piece together the undirected skeleton from the local GLL-PC results.
3. Use any desired edge orientation scheme to orient edges.

Figure 1

HHC Local-to-Global Learning Method (Configuration of LGL)

1. Find $PC(X)$ for every variable $X$ in data using Semi-Interleaved HITON-PC (with or without symmetry correction) [13] and lexicographic prioritization.
2. Piece together the undirected skeleton using an "OR rule" (an edge exists between $A$ and $B$ iff $A$ is in $PC(B)$ or $B$ is in $PC(A)$).
3. Use greedy steepest-ascent Tabu search and BDeu score [27] to orient edges.

Figure 2

HHC-Bach Local-to-Global Learning Method (Configuration of LGL)

1. Find $PC(X)$ for every variable $X$ in data using Semi-Interleaved HITON-PC (with or without symmetry correction) [13] and lexicographic prioritization.
2. Piece together the undirected skeleton using an "OR rule" (an edge exists between $A$ and $B$ iff $A$ is in $PC(B)$ or $B$ is in $PC(A)$).
3. Use greedy steepest-ascent Tabu search and Bach's score [28] to orient edges.

Figure 3

LGL-OO Local-to-Global Learning Method with Optimal Order ( LGL with dynamic prioritization and interrupted local learning)

1. Find $PC(X)$ for every variable $X$ in data using GLL-PC with dynamic prioritization and without symmetry correction [13]:
    a. Order variables randomly
    b. Repeat
    c. - Start learning the local neighborhood for all variables in current order
        - Interrupt processing of a variable when a number of conditional independence tests equal to *testnum* has been completed for the variable or until GLL-PC terminates for that variable
        - When GLL-PC terminates or it is interrupted for a variable, share the membership results with all other variables (i.e., force strongly relevants in the Tentative PC set of the corresponding variables never allowing to be excluded thereafter and force identified weakly relevants and irrelevants out of the corresponding variables never to be considered again)
    d. For each variable X calculate a revised optimal priority score for X on the basis of (i) how fast GLL-PC is able to eliminate candidate causes and effects for X, (ii) CIT results for that variable as well as other variables in the dataset and (iii) the ability of X to eliminate other variables from tentative PC sets up to the point of interrupt.
    e. Re-rank unresolved variables (i.e. where GLL-PC has not terminated yet) using their $R$ scores, from largest to smallest
    f. Until GLL-PC has terminated for all variables
2. Piece together the undirected skeleton from the local GLL-PC results.
3. Use any desired edge orientation scheme to orient edges.

Figure 4

HHC-OO Local-to-Global Learning Method with Optimal Order (Configuration of LGL-OO)

1. Find $PC(X)$ for every variable $X$ in data using Semi-Interleaved HITON-PC with dynamic prioritization and without symmetry correction [13]:
   a. Order variables randomly
   b. Repeat
   c. - Start learning the local neighborhood for all variables in current order
      - Interrupt processing of a variable when a number of conditional independence tests equal to *testnum* has been completed for the variable or until Semi-Interleaved HITON-PC terminates for that variable
      - When Semi-Interleaved HITON-PC terminates or it is interrupted for a variable, share the membership results with all other variables (i.e., force strongly relevants in the Tentative PC set of the corresponding variables never allowing to be excluded thereafter and force identified weakly relevants and irrelevants out of the corresponding variables never to be considered again)
   d. For each variable $X$ calculate the quantity $R$ = number of eliminated variables by HITON-PC running on $X$/ total number of conditional independence tests employed so far for $X$.
   e. Re-rank unfinished variables (i.e. where Semi-Interleaved HITON-PC has not terminated yet) using their $R$ scores, from largest to smallest
   f. Until Semi-Interleaved HITON-PC has terminated for all variables
2. Piece together the undirected skeleton using an "OR rule" (an edge exists between $A$ and $B$ iff $A$ is in $PC(B)$ or $B$ is in $PC(A)$).
3. Use greedy steepest-ascent Tabu search and BDeu score [27] to orient edges.

Figure 5

HHC

| | Dataset | | | | | | | | |
|---|---|---|---|---|---|---|---|---|---|
| | *Child10* | *Insurance10* | *Alarm10* | *Hailfinder10* | *Pigs* | *Munin* | *Lung_Cancer* | *Gene* | *Link* |
| Extra edges in learned skeleton | 95 | 143 | 176 | 1265 | 276 | 36 | 621 | 601 | 1456 |
| Missing edges in learned skeleton | 25 | 149 | 165 | 359 | 0 | 257 | 91 | 6 | 439 |
| Structural Hamming distance for DAG | 101 | 297 | 344 | 728 | 4 | 273 | 187 | 72 | 1150 |
| Bayesian score for DAG | -188.61 | -229.02 | -178.56 | -738.77 | -496.11 | -33.14 | -559.43 | -651.36 | -337.74 |
| Number of statistical tests for skeleton construction | 28,879 | 52,757 | 82,543 | 217,490 | 134,244 | 733 | 859,348 | 401,779 | 7,931,044 |
| Time for building skeleton (in minutes) | 0.74 | 1.59 | 2.47 | 8.05 | 3.98 | 0.23 | 24.40 | 12.32 | 537.72 |
| Total time for running method (in minutes) | 1.21 | 3.32 | 6.80 | 24.84 | 14.33 | 0.47 | 181.97 | 60.14 | 563.46 |

MMHC

| | Dataset | | | | | | | | |
|---|---|---|---|---|---|---|---|---|---|
| | *Child10* | *Insurance10* | *Alarm10* | *Hailfinder10* | *Pigs* | *Munin* | *Lung_Cancer* | *Gene* | *Link* |
| Extra edges in learned skeleton | 71 | 128 | 184 | 1220 | 281 | 38 | 567 | 557 | 1541 |
| Missing edges in learned skeleton | 25 | 148 | 164 | 352 | 0 | 258 | 88 | 4 | 396 |
| Structural Hamming distance for DAG | 100 | 296 | 346 | 725 | 4 | 275 | 191 | 69 | 1145 |
| Bayesian score for DAG | -188.95 | -229.03 | -179.09 | -738.80 | -496.11 | -33.12 | -559.01 | -651.12 | -337.62 |
| Number of statistical tests for skeleton construction | 32,980 | 67,943 | 90,117 | 243,571 | 177,278 | 1,023 | 1,360,493 | 451,364 | 644,055 |
| Time for building skeleton (in minutes) | 0.81 | 1.99 | 2.49 | 12.81 | 5.45 | 0.38 | 55.16 | 12.23 | 382.93 |
| Total time for running method (in minutes) | 1.42 | 3.79 | 5.21 | 29.54 | 13.11 | 0.46 | 451.70 | 51.84 | 415.69 |

Figure 6

| Number of parents of Y | order from low-to-high connectivity | | | random order (average results over 10 orders) | | | order from high-to-low connectivity | | |
|---|---|---|---|---|---|---|---|---|---|
| | extra edges | missing edges | CITs | extra edges | missing edges | CITs | extra edges | missing edges | CITs |
| 10 | 2 | 0 | 63 | 2 | 0 | 2,461 | 2 | 0 | 4,325 |
| 20 | 4 | 0 | 233 | 4.7 | 5.2 | 26,203 | 5 | 7 | 29,774 |
| 30 | 12 | 0 | 526 | 12 | 12.4 | 41,499 | 11 | 21 | 9,020 |
| 40 | 13 | 0 | 904 | 16.4 | 20.1 | 51,269 | 19 | 33 | 5,626 |
| 50 | 22 | 7 | 1,428 | 28.8 | 30 | 16,828 | 34 | 43 | 4,149 |
| 60 | 29 | 7 | 2,001 | 32.9 | 35.7 | 36,950 | 38 | 54 | 3,862 |
| 70 | 41 | 19 | 2,773 | 45.7 | 37.9 | 24,456 | 55 | 63 | 4,464 |
| 80 | 58 | 28 | 3,652 | 65.4 | 55.1 | 12,630 | 70 | 74 | 5,023 |
| 90 | 66 | 35 | 4,634 | 72.3 | 57.6 | 16,718 | 87 | 85 | 5,592 |
| 100 | 77 | 44 | 5,594 | 88.7 | 80 | 16,266 | 96 | 94 | 7,229 |

Figure 7

| Number of children of Y | order from low-to-high connectivity | | | random order (average results over 10 orders) | | | order from high-to-low connectivity | | |
|---|---|---|---|---|---|---|---|---|---|
| | extra edges | missing edges | CITs | extra edges | missing edges | CITs | extra edges | missing edges | CITs |
| 10 | 1 | 0 | 106 | 1 | 0 | 2,342 | 1 | 0 | 4,366 |
| 20 | 11 | 0 | 489 | 9.7 | 0 | 141,148 | 9 | 0 | 377,448 |
| 30 | 18 | 0 | 1,173 | 16.8 | 0 | 2,321,030 | 17 | 0 | 5,020,400 |
| 40 | 24 | 0 | 1,968 | - | - | - | - | - | - |
| 50 | 33 | 0 | 3,190 | - | - | - | - | - | - |
| 60 | 48 | 0 | 5,031 | - | - | - | - | - | - |
| 70 | 53 | 0 | 6,899 | - | - | - | - | - | - |
| 80 | 71 | 0 | 8,939 | - | - | - | - | - | - |
| 90 | 76 | 0 | 11,448 | - | - | - | - | - | - |
| 100 | 95 | 0 | 14,677 | - | - | - | - | - | - |

Figure 8

|  | Child10 | | | | Pigs | | | | Hailfinder10 | | | |
| --- | --- | --- | --- | --- | --- | --- | --- | --- | --- | --- | --- | --- |
|  | RFE | LARS | UAF | HHC | RFE | LARS | UAF | HHC | RFE | LARS | UAF | HHC |
| Extra edges in learned skeleton | 2078 | 7558 | 3014 | 95 | 2262 | 29570 | 5593 | 276 | 6424 | 40948 | 7904 | 1265 |
| Missing edges in learned skeleton | 26 | 8 | 20 | 25 | 2 | 0 | 0 | 0 | 461 | 211 | 325 | 359 |
| Structural Hamming distance for DAG | 121 | 117 | 135 | 101 | 76 | 102 | 7 | 4 | 796 | 756 | 733 | 728 |
| Bayesian score for DAG | -190.0 | -189.1 | -189.8 | -188.61 | -497.2 | -496.8 | -496.4 | -496.11 | -740.5 | -736.4 | -737.4 | -738.77 |
| Time for building skeleton (in minutes) | 41.63 | 43.57 | 44.97 | 0.74 | 348.44 | 184.47 | 355.59 | 3.98 | 572.13 | 365.45 | 581.34 | 8.05 |
| Total time for running method (in minutes) | 43.23 | 48.52 | 47.05 | 1.21 | 361.15 | 265.07 | 373.54 | 14.33 | 603.62 | 503.63 | 612.63 | 24.84 |

|  | Gene | | | | Lung_Cancer | | | |
| --- | --- | --- | --- | --- | --- | --- | --- | --- |
|  | RFE | LARS | UAF | HHC | RFE | LARS | UAF | HHC |
| Extra edges in learned skeleton | 4039 | 55384 | 9834 | 621 | 7469 | 38753 | 12486 | 601 |
| Missing edges in learned skeleton | 47 | 8 | 28 | 91 | 120 | 24 | 78 | 6 |
| Structural Hamming distance for DAG | 125 | 156 | 115 | 187 | 220 | 139 | 175 | 72 |
| Bayesian score for DAG | -658.3 | -653.1 | -655.1 | -559.43 | -562.4 | -555.6 | -560.1 | -651.36 |
| Time for building skeleton (in minutes) | 737.99 | 513.12 | 783.97 | 24.40 | 493.84 | 377.85 | 563.46 | 12.32 |
| Total time for running method (in minutes) | 784.54 | 912.33 | 890.63 | 181.97 | 708.77 | 1096.19 | 855.18 | 60.14 |

Figure 9

| Method | Brief Description | Complexity | References |
|---|---|---|---|
| (I) UNIVARIATE | | | |
| Relevance Networks 1 | Genes with statistically significant pairwise mutual information (MI) are connected by edges. MI was estimated using the procedure from Aracne method. | $O(n^2p^2)$ | [29-31] |
| Relevance Networks 2 | Genes with statistically significant pairwise mutual information (MI) are connected by edges. MI was estimated using the procedure by Qiu et al. This method incorporated the procedure of Butte and Kohane to assess significance of gene pairwise MI. | $O(n^2p^2)$ | [30, 32] |
| CLR | Genes with statistically significant mutual information (MI) relative to background MI are connected by edges. | $O(n^2p^2)$ | [33] |
| Fisher | Genes with statistically significant association according to Fisher's Z-test are connected by edges. | $O(np^2)$ | [34] |
| (II) MULTIVARIATE MUTUAL INFORMATION-BASED | | | |
| Aracne | First, genes with statistically significant pairwise mutual information are connected by edges. Next, data processing inequality (DPI) is applied to triplets of genes in order to eliminate indirect interactions. | $O(p^3 + n^2p^2)$ | [29, 31] |
| SA-CLR | Uses three-way mutual information to score triplets of genes, and connect genes by edges assuming cooperative regulation. | $O(n^3p^3)$ | [35] |
| (III) MULTIVARIATE CORRELATION-BASED | | | |
| Hierarchical Clustering | Clustering genes by pairwise Pearson correlation. Genes in each clique are connected by edges. | $O(p^3 + np^2)$ | [36, 37] |
| (IV) MULTIVARIATE CAUSAL GRAPH-BASED | | | |
| qp-graphs | This method starts from a full graph and searches for a subset of genes that renders two genes conditionally independent of each other. | $O(p^2r(q^2n+q^3))$ | [38, 39] |
| (V) MULTIVARIATE GAUSSIAN GRAPHICAL MODELS | | | |
| GeneNet | Edges are added between genes with non-zero full-order partial correlation. Correlations are found by estimating a covariance matrix using a shrinkage method. | $O(p^3 + np^2)$ | [40] |
| Graphical Lasso | Edges are added between genes with non-zero full-order partial correlation. Correlations are found by estimating a covariance matrix using coupled lasso regressions. | $O(p^3 + np^2)$ | [41, 42] |

Figure 10

| Dataset | Gold-Standard | | | | Gene expression data | | |
|---|---|---|---|---|---|---|---|
| | Description | No. of TFs | No. of genes | No. of edges | Description | No. of arrays | No. of genes |
| ECOLI(A) | TF-gene interactions from RegulonDB 6.4 (strong evidence), [19] | 140 | 1,053 | 1,982 | E.coli gene expression dataset from [18] | 907 | 4,297 |
| ECOLI(B) | TF-gene interactions from RegulonDB 6.4 (strong and weak evidence), [19] | 174 | 1,465 | 3,399 | | | |
| ECOLI(C) | DREAM2 TF-gene network from RegulonDB 6.0, [20] | 152 | 1,135 | 3,070 | | | |
| ECOLI(D) | DREAM2 TF-gene network from RegulonDB 6.0, [20] | 152 | 1,146 | 3,091 | E.coli gene expression dataset from DREAM2 [20] | 300 | 3,456 |
| YEAST(A) | TF-gene interactions from [17], ($\alpha = 0.001$, C = 0) | 116 | 2,779 | 6,455 | Yeast gene expression dataset from [18] | 530 | 5,520 |
| YEAST(B) | TF-gene interactions from [17], ($\alpha = 0.001$, C = 1) | 115 | 2,295 | 4,754 | | | |
| YEAST(C) | TF-gene interactions from [17], ($\alpha = 0.001$, C = 2) | 115 | 1,949 | 3,667 | | | |
| YEAST(D) | TF-gene interactions from [17], ($\alpha = 0.005$, C = 0) | 116 | 3,508 | 10,915 | | | |
| YEAST(E) | TF-gene interactions from [17], ($\alpha = 0.005$, C = 1) | 115 | 2,872 | 7,491 | | | |
| YEAST(F) | TF-gene interactions from [17], ($\alpha = 0.005$, C = 2) | 115 | 2,372 | 5,448 | | | |

Figure 11

| Dataset | Gold-Standard | | | | | Gene expression data | |
|---|---|---|---|---|---|---|---|
| | Description | No. of TFs | No. of genes | No. of edges | Description | No. of arrays | No. of genes |
| REGED | REGED network | - | 1,000 | 1,148 | First 500 instances from REGED dataset | 500 | 1,000 |
| GNW(A) | Yeast regulatory network from GNW 2.0 | 157 | 4,441 | 12,864 | 25 time series with 21 time points in each generated by GNW 2.0 | 525 | 4,441 |
| GNW(B) | 1000-gene subnetwork of Yeast regulatory network from GNW 2.0 | 68 | 1,000 | 3,221 | 25 time series with 21 time points in each generated by GNW 2.0 | 525 | 1,000 |
| GNW(C) | E.coli network from GNW 2.0 | 166 | 1,502 | 3,476 | 25 time series with 21 time points in each generated by GNW 2.0 | 525 | 1,502 |
| GNW(D) | 1000-gene subnetwork of E.coli regulatory network from GNW 2.0 | 121 | 1,000 | 2,361 | 25 time series with 21 time points in each generated by GNW 2.0 | 525 | 1,000 |

Figure 12

| | Method | REGED | GNW(A) | GNW(B) | GNW(C) | GNW(D) | ECOLI(A) | ECOLI(B) | ECOLI(C) | ECOLI(D) | YEAST(A) | YEAST(B) | YEAST(C) | YEAST(D) | YEAST(E) | YEAST(F) |
|---|---|---|---|---|---|---|---|---|---|---|---|---|---|---|---|---|
| Aracne | $\alpha = 10^{-7}$ | 0.930 | 0.796 | 0.725 | 0.840 | 0.864 | 0.851 | 0.862 | 0.826 | 0.858 | 0.969 | 0.970 | 0.972 | 0.958 | 0.962 | 0.963 |
| | $\alpha = 0.05$ | 0.825 | 0.802 | 0.739 | 0.841 | 0.868 | 0.851 | 0.862 | 0.826 | 0.858 | 0.969 | 0.970 | 0.972 | 0.958 | 0.962 | 0.963 |
| Relevance Networks 1 | $\alpha = 10^{-7}$ | 0.995 | 0.953 | 0.888 | 0.965 | 0.942 | 0.985 | 0.985 | 0.980 | 0.975 | 0.980 | 0.982 | 0.983 | 0.973 | 0.977 | 0.980 |
| | $\alpha = 0.05$ | 0.997 | 0.981 | 0.950 | 0.985 | 0.979 | 0.986 | 0.986 | 0.981 | 0.981 | 0.980 | 0.982 | 0.983 | 0.973 | 0.977 | 0.980 |
| Relevance Networks 2 | | 0.994 | 0.937 | 0.903 | 0.954 | 0.948 | 0.984 | 0.984 | 0.979 | 0.968 | 0.979 | 0.981 | 0.982 | 0.972 | 0.977 | 0.979 |
| SA-CLR | $\alpha = 0.05$ | 0.976 | 0.944 | 0.880 | 0.949 | 0.933 | 0.960 | 0.963 | 0.956 | 0.953 | 0.978 | 0.980 | 0.982 | 0.972 | 0.976 | 0.978 |
| | FDR = 0.05 | 0.778 | 0.858 | 0.762 | 0.873 | 0.868 | 0.899 | 0.908 | 0.893 | 0.882 | 0.970 | 0.971 | 0.974 | 0.962 | 0.965 | 0.968 |
| CLR | Normal MI estimator; $\alpha = 0.05$ | 0.963 | 0.928 | 0.850 | 0.933 | 0.913 | 0.951 | 0.957 | 0.947 | 0.947 | 0.979 | 0.981 | 0.982 | 0.973 | 0.977 | 0.978 |
| | Normal MI estimator; FDR = 0.05 | 0.693 | 0.846 | 0.737 | 0.855 | 0.849 | 0.837 | 0.901 | 0.879 | 0.888 | 0.972 | 0.972 | 0.974 | 0.965 | 0.969 | 0.970 |
| | Stouffer MI estimator; $\alpha = 0.05$ | 0.975 | 0.934 | 0.858 | 0.939 | 0.920 | 0.959 | 0.963 | 0.955 | 0.953 | 0.979 | 0.981 | 0.982 | 0.973 | 0.977 | 0.978 |
| | Stouffer MI estimator; FDR = 0.05 | 0.736 | 0.858 | 0.751 | 0.866 | 0.859 | 0.911 | 0.922 | 0.907 | 0.905 | 0.974 | 0.975 | 0.976 | 0.967 | 0.971 | 0.972 |
| LGL-Bach | max-k = 1, w/o symmetry | | | 0.665 | 0.720 | 0.788 | | | | 0.611 | | | | | | |
| | max-k = 2, w/o symmetry | | 0.571 | 0.655 | 0.724 | | | | | 0.558 | | | 0.941 | | | |
| | max-k = 3, w/o symmetry | | 0.553 | 0.655 | 0.734 | | | | | 0.578 | | | | | | |
| | max-k = 1, with symmetry | | | 0.663 | | 0.790 | | | | | | | 0.951 | | | |
| | max-k = 2, with symmetry | | | 0.653 | | | | | | | | | | | | |
| | max-k = 3, with symmetry | | | | | | | | | | | | | | | |
| Hierarchical Clustering | | 0.996 | 0.944 | 0.850 | 0.950 | 0.914 | 0.960 | 0.964 | 0.956 | 0.956 | 0.979 | 0.981 | 0.982 | 0.973 | 0.976 | 0.979 |
| Graphical Lasso | | 0.801 | | | | 0.635 | 0.805 | 0.840 | 0.786 | | 0.970 | 0.973 | 0.973 | 0.964 | 0.969 | 0.966 |
| GeneNet | $\alpha = 0.05$ | 0.975 | 0.974 | 0.938 | 0.982 | 0.972 | 0.965 | 0.971 | 0.961 | 0.961 | 0.971 | 0.972 | 0.973 | 0.963 | 0.967 | 0.969 |
| | FDR = 0.05 | 0.805 | 0.970 | 0.943 | 0.977 | 0.969 | 0.895 | 0.912 | 0.887 | 0.891 | 0.960 | 0.961 | 0.961 | 0.951 | 0.956 | 0.956 |
| qp-graphs | q = 1 | 0.996 | 0.979 | 0.946 | 0.984 | 0.977 | 0.986 | 0.986 | 0.981 | 0.981 | 0.980 | 0.982 | 0.983 | 0.973 | 0.977 | 0.980 |
| | q = 2 | 0.996 | 0.980 | 0.949 | 0.985 | 0.978 | 0.986 | 0.986 | 0.981 | 0.981 | 0.980 | 0.982 | 0.983 | 0.973 | 0.978 | 0.980 |
| | q = 3 | 0.996 | 0.981 | 0.949 | 0.985 | 0.979 | 0.986 | 0.986 | 0.981 | 0.981 | 0.980 | 0.984 | 0.985 | 0.973 | 0.978 | 0.981 |
| | q = 20 | 0.995 | 0.981 | 0.950 | 0.985 | 0.979 | 0.986 | 0.986 | 0.981 | 0.981 | 0.980 | 0.982 | 0.983 | 0.973 | 0.977 | 0.980 |
| | q = 200 | 0.996 | 0.979 | 0.949 | 0.983 | 0.977 | 0.985 | 0.986 | 0.981 | 0.981 | 0.980 | 0.982 | 0.983 | 0.973 | 0.977 | 0.980 |
| Fisher | $\alpha = 0.05$ | 0.996 | 0.975 | 0.935 | 0.980 | 0.972 | 0.984 | 0.985 | 0.979 | 0.978 | 0.980 | 0.982 | 0.983 | 0.973 | 0.977 | 0.980 |
| | FDR = 0.05 | 0.996 | 0.973 | 0.932 | 0.979 | 0.971 | 0.984 | 0.985 | 0.979 | 0.978 | 0.980 | 0.982 | 0.984 | 0.973 | 0.977 | 0.980 |
| Full Graph | | 0.998 | 0.981 | 0.952 | 0.985 | 0.979 | 0.986 | 0.986 | 0.981 | 0.981 | 0.980 | 0.982 | 0.983 | 0.973 | 0.977 | 0.980 |
| Empty Graph | | 0.998 | 0.981 | 0.952 | 0.985 | 0.979 | 0.986 | 0.986 | 0.981 | 0.981 | 0.980 | 0.982 | 0.983 | 0.973 | 0.977 | 0.980 |

DATA ANALYSIS COMPUTER SYSTEM AND METHOD EMPLOYING LOCAL TO GLOBAL CAUSAL DISCOVERY

Benefit of U.S. Provisional Application No. 61/798,264 filed on Mar. 15, 2013 is hereby claimed.

BACKGROUND OF THE INVENTION

Field of Application

The field of application of the invention is data analysis especially as it applies to (so-called) "Big Data" (see sub-section 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics

Big Data Analytics problems are often defined as the ones that involve Big Data Volume, Big Data Velocity, and/or Big Data Variation [2].

Big Data Volume may be due to large numbers of variables, or big numbers of observed instances (objects or units of analysis), or both.

Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).

Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis

The main types of data analytics [4] are:

a. Classification for Diagnostic or Attribution Analysis: where a typically computer-implemented system produces a table of assignments of objects into predefined categories on the basis of object characteristics.

Examples: medical diagnosis; email spam detection; separation of documents as responsive and unresponsive in litigation.

b. Regression for Diagnostic Analysis: where a typically computer-implemented system produces a table of assignments of numerical values to objects on the basis of object characteristics.

Examples: automated grading of essays; assignment of relevance scores to documents for information retrieval; assignment of probability of fraud to a pending credit card transaction.

c. Classification for Predictive Modeling: where a typically computer-implemented system produces a table of assignments of objects into predefined categories on the basis of object characteristics and where values address future states (i.e., system predicts the future).

Examples: expected medical outcome after hospitalization; classification of loan applications as risky or not with respect to possible future default; prediction of electoral results.

d. Regression for Predictive Modeling: where a typically computer-implemented system produces a table of assignments of numerical values to objects on the basis of object characteristics and where values address future states (i.e., system predicts the future).

Examples: predict stock prices at a future time; predict likelihood for rain tomorrow; predict likelihood for future default on a loan.

e. Explanatory Analysis: where a typically computer-implemented system produces a table of effects of one or more factors on one or more attributes of interest; also producing a catalogue of patterns or rules of influences.

Examples: analysis of the effects of sociodemographic features on medical service utilization, political party preferences or consumer behavior.

f. Causal Analysis: where a typically computer-implemented system produces a table or graph of causes-effect relationships and corresponding strengths of causal influences describing thus how specific phenomena causally affect a system of interest.

Example: causal graph models of how gene expression of thousands of genes interact and regulate development of disease or response to treatment; causal graph models of how socioeconomic factors and media exposure affect consumer propensity to buy certain products; systems that optimize the number of experiments needed to understand the causal structure of a system and manipulate it to desired states.

g. Network Science Analysis: where a typically computer-implemented system produces a table or graph description of how entities in a mg system inter-relate and define higher level properties of the system.

Example: network analysis of social networks that describes how persons interrelate and can detect who is married to whom; network analysis of airports that reveal how the airport system has points of vulnerability (i.e., hubs) that are responsible for the adaptive properties of the airport transportation system (e.g., ability to keep the system running by rerouting flights in case of an airport closure).

h. Feature selection, dimensionality reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together; grouping of customers into marketing segments with uniform buying behaviors.

j. Feature construction: where a typically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

3. Specific Examples of Data Analytics Application Areas

The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service).
21. Product and service pricing.
22. Evaluate and predict academic performance and impact.
23. Litigation: predictive coding, outcome/cost/duration prediction, bias of courts, voire dire.
24. Games (e.g., chess, backgammon, jeopardy).
25. Econometrics analysis.
26. University admissions modeling.
27. Mapping fields of activity.
28. Movie recommendations.
29. Analysis of promotion and tenure strategies.
30. Intension detection and lie detection based on fMRI readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics, companion drugs and personalized medicine.
35. Medical diagnosis, prognosis and risk assessment.
36. Automated grading of essays.
37. Detection of plagiarism.
38. Weather and other physical phenomena forecasting.

Discovery of causal networks in particular, is essential for understanding mechanisms of complex systems in various application domains. The inventive method uses local causal discovery methods for global causal network learning in a divide-and-conquer fashion.

The invention can be applied to practically any field where discovery of causal or predictive models is desired however because it relies on extremely broad distributional assumptions that are valid in numerous fields. Because the discovery of causal models facilitates feature selection, model conversion and explanation, inference and practically all aspects of data analytics, the invention is applicable and useful all the above mentioned types of data analysis and application areas.

Description of Related Art

A precursor to the main idea behind the local-to-global learning approach can be found in SCA [6], where a heuristic approximation of the local causes of every variable constraints the space of search of the standard Greedy search-and-score Bayesian method for global learning increasing thus computational efficiency. Other related methods include MMHC [7], Greedy Search, GES [8], OR [9], PC [10], and TPDA [11, 12]. Methods for inference of gene regulatory/transcriptional networks from high-dimensional gene expression data, the application domain of the present invention, are shown in FIG. 10.

BRIEF DESCRIPTION OF THE FIGURES

FIG. 1 shows the Local-to-Global (LGL) general method for global network learning.

FIG. 2 shows the HHC method for global network learning, as a configuration of the LGL method.

FIG. 3 shows the HHC-Bach method for global network learning, as a configuration of the LGL method.

FIG. 4 shows the LGL-OO (LGL with optimal order) method for global network learning, as a variant of the LGL method.

FIG. 5 shows the HHC-OO (HHC with optimal order) method for global network learning, as a configuration of the LGL-OO method.

FIG. 6 shows comparison of HHC and MMHC global learning methods. Both methods were executed on a random sample of size 1000, using default parameters of MMHC as implemented in Causal Explorer (i.e., $G^2$ test for conditional independence, $\alpha=0.05$, max-k=10, Dirichlet weight=10, BDeu priors).

FIG. 7 shows results of simulation experiment with HHC method. The graphical structure is depicted on FIG. 14(a). HHC was run on a random sample of size 1,000 with $G^2$ test for conditional independence, $\alpha=0.05$, max-k=5, Dirichlet weight=10, BDeu priors.

FIG. 8 shows results of simulation experiment with HHC method. The graphical structure is depicted on FIG. 14(b). HHC was run on a random sample of size 1,000 with $G^2$ test for conditional independence, $\alpha=0.05$, max-k=5, Dirichlet weight=10, BDeu priors. Empty cells correspond to experiments when the method did not terminate within 10,000,000 CITs.

FIG. 9 shows results for hybrid methods using RFE, LARS-EN and UAF.

FIG. 10 shows list of global network learning methods used for reverse-engineering of gene regulatory networks. Methods are presented along with a brief description, computational complexity, and references. Methods denoted with "†" can only output graphs. Methods denoted with "*" were assessed with the above metrics by converting their output (scores for all graph edges) into a graph by thresholding edge. While qp-graphs are listed in the multivariate causal graph-based category, they can also be considered a representative of the multivariate Gaussian-graphical models family. The "Complexity" column has the following notation: p=number of genes in the dataset; n=number of samples in the dataset (typically, n>>p); q=size of conditioning set in qp-graphs; r=number of conditional independence tests performed for each pair of genes in qp-graphs; m=max-k parameter of HHC-Bach that denotes maximum size of a conditioning set; |PC|=average number of genes in the local causal neighborhood (i.e., genes directly upstream and downstream of the target gene).

FIG. 11 provides description of the real gold-standards used in this study, along with the gene-expression data used for reverse-engineering the transcriptional network.

FIG. 12 provides description of the simulated gold-standards and dataset used in this study.

FIG. 13 shows combined PPV and NPV metric (Euclidean distance from the optimal method with PPV=1 and NPV=1) for 30 methods/variants over 15 datasets. Methods denoted "Full Graph" and "Empty Graph" output the fully connected and empty regulatory networks, respectively. Cells with lighter highlighting correspond to less accurate methods; cells with darker highlighting correspond to more accurate methods. HHC-Bach is denoted as LGL-Bach in this figure.

DETAILED DESCRIPTION OF THE INVENTION

Figure 14:
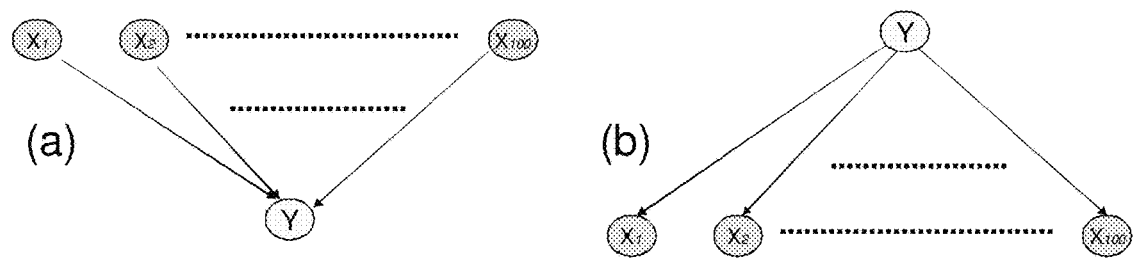
FIG. 14 shows two examples where the variable ordering for local learning can make execution of the LGL method from quadratic to exponential-time.

The present invention describes use of local causal discovery methods for global causal network learning in a divide-and-conquer fashion. We remind that a major motivation for pursuing local causal learning methods is scaling up causal discovery and causal feature selection as explained in [13]. The key points of the following description are that (a) the local-to-global framework can be configured in several ways with excellent empirical results; (b) an important previously unnoticed factor is the variable order in which to execute local learning, and (c) trying to use non-causal feature selection in order to facilitate global learning (instead of causal local learning) is not as a promising strategy as previously thought.

Given powerful methods for finding local neighborhoods, for example those provided by the GLL framework, one can circumvent the need for uniform connectivity (as well as user knowledge of that connectivity) and avoid the application of inefficient heuristics employed in SCA [6] thus improving on quality and speed of execution. FIG. 1 provides the general method termed LGL (for local-to-global learning). Steps #1-3 can be configured in numerous ways. An "admissible configuration" of the general LGL method and system is one that guarantees correct output for the configured method. For example, by configuring LGL to use GLL-PC with symmetry correction as the underlying subprocess for identifying local causes and effects for each variable (GLL-PC defined in [13]) then the following constitute admissible configuration criteria:

i. Configure GLL-PC with admissible configurations of steps #1, and step #2 [13];
  ii. Employ a sound orientation scheme in step #3, of LGL. The above 2 configuration criteria render the total configuration sound under the assumptions of correctness of GLL-PC [13] and comprise the admissibility requirements (criteria) for the admissible configuration of the LGL method. Stated more generally:

Statement of operating characteristics. Under the following sufficient conditions LGL outputs correctly oriented causal graphs:

a. Configure GLL-PC in step #1 of LGL using any admissible configuration of GLL-PC [13].
  b. Connect local neighborhoods discovered by GLL-PC in step #2 of LGL so that an edge between A and B is established if and only if A is a member of the output of GLL-PC run on B and A is a member of the output of GLL-PC run on B,
  c. Orient the skeleton produced at step #2 of LGL using any sound orientation method (e.g., PC [10, 13]).
  d. Employ LGL in data that have the property that there is a causal Bayesian network faithful to the data distribution P [13];
  e. Employ statistically correct procedures for the determination of variable dependences and independence from the sample data D [13];
  f. Employ LGL in data that have the property that causal sufficiency in V [13].

To demonstrate the generality and robustness of the LGL general method we describe here as a configuration of LGL, a global learning method termed HHC (FIG. 2), and compare it empirically to the state-of-the-art MMHC method [7]. We also show that the two methods are not identical in edge quality or computational efficiency, with the new method being at least as good on average as MMHC.

FIG. 6 presents results for missing/extra edges in undirected skeleton, number of statistical tests for construction of skeleton, structural Hamming distance (SHD), Bayesian score, and execution time on 9 of the largest datasets used for the evaluation of MMHC [7]. HHC used GLL-PC without symmetry correction. Since the datasets were simulated from known networks, the method output can be compared to the true structure. As can be seen, in all 9 datasets, HHC performs equally well with MMHC in terms of SHD and Bayesian score. In 8 out of 9 datasets it performs from 10% to 50% fewer tests, and in one dataset (Link) it performs >10 times the tests performed by MMHC resulting in running 35% slower in terms of execution time. Because MMHC was found to be superior to a number of other methods for the datasets tested, HHC's better performance over MMHC in 8 out of 9 datasets (in terms of number of statistical tests for skeleton construction) and similar performance in 9 out of 9 datasets (in terms of quality metrics) translates also to excellent performance of HHC relative to Greedy Search, GES, OR, PC, TPDA, and SCA [7].

An important parameter of local-to-global learning previously unnoticed in methods such as SCA and MMHC is the ordering of variables when executing the local causal discovery variable-by-variable (i.e., not in parallel). We will assume that results are shared among local learning runs of GLL-PC, i.e. when we start learning PC(X) by GLL-PC rather than starting with an empty TPC(X) set, we start with all variables Y: X∈PC(Y). This constitutes a sound configuration of the GLL-PC method template as explained in [13]. FIG. 14 gives two extreme examples where the right order can "make-or-break" an LGL method. In FIG. 14(a) it follows that an order of local learning $<X_1, X_2, \ldots, X_{100}, Y>$ without symmetry correction requires a quadratic number of conditional independence tests (CITs) for the unoriented graph to be correctly learned. However, the order of local learning $<Y, X_1, X_2, \ldots, X_{100}>$ requires up to an exponential number of CITs as the max-k parameter of GLL-PC and sample are allowed to grow without bounds. Even with modest max-k values, the number of CITs is higher-order polynomial and thus intractable. Even when Y is not in the beginning but as long as a non-trivial number of X's are after it in the ordering, the method will be intractable or at least very slow. The latter setting occurs in the majority of runs of the method with random orderings.

In FIG. 7 we provide data from a simulation experiment showing the above in concrete terms and exploring the effects of limited sample and connectivity at the same time. As can be seen, under fixed sample, running HHC with order from larger to smaller connectivity, as long as the sample is enough for the number of parents to be learned (i.e., number of parents is ≤20), increases run time by more than 100-fold. However because sample is fixed, as the number of parents grows the number of conditional independence tests equalizes between the two strategies because CITs that have too large conditioning sets for the fixed sample size are not executed.

Although the number of CITs is self-limiting under these conditions, quality (in terms of number of missing edges, i.e., number of undiscovered parents of T) drops very fast as number of parents increases. The random ordering strategy trades off quality for execution time with the wrong (larger-to-smaller connectivity) ordering, however in all instances the right ordering offers better quality and 2 to 100-fold faster execution that random ordering.

A more dramatic difference exists for the structure in FIG. 14(b) where Y is parent of all X's. Here the number of tests required to find the parent (Y) of each $X_i$ is quadratic to the number of variables with the right ordering (low-to-high connectivity) whereas an exponential number is needed with the wrong ordering (large-to-small connectivity). Because the sample requirements are constant to the number of children of Y, quality is affected very little and there is no self-restricting effect of the number of CITs, opposite to what holds for causal structure in FIG. 14(a). Hence the number of CITs grows exponentially larger for the large-to-small connectivity ordering versus the opposite ordering and a similar trend is also present for the average random ordering in full concordance with our theoretical expectations. See FIG. 8 for results of related simulation experiments.

These results show that in some cases, it is possible to transform an intractable local learning problem into a tractable one by employing a global learning strategy (i.e., by exploiting asymmetries in connectivity). Thus the variable order in local-to-global learning may have promise for substantial speedup and improved quality in real-life datasets (assuming the order of connectivity is known or can be estimated). However the optimal order is a priori unknown for many domains. Can we use local variable connectivity as a proxy to optimal order in real data? The next experiment assumes the existence of an oracle that gives the true local connectivity for each variable. The experiment examines empirically the effect of three orders (low-to-high connectivity, lexicographical (random) order, and high-to-low connectivity order) on the quality of learning and number of CITs in the MMHC evaluation datasets. It also compares the sensitivity of HHC and MMHC to order.

Figure 15:
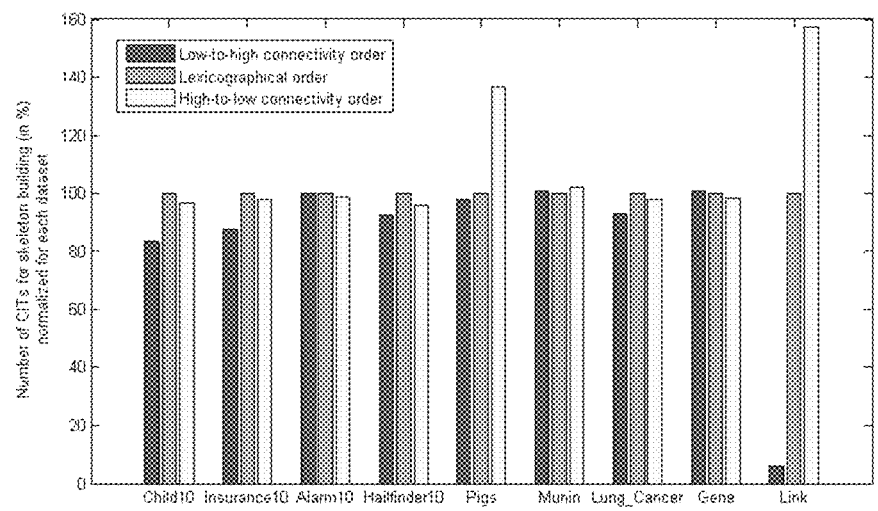
FIG. 15 shows the number of CITs (conditional independence tests) required for skeleton construction during execution of HHC expressed as % points and normalized within each dataset to lexicographical order. Data for three orderings of variables is shown on the figure: low-to-high connectivity, lexicographical, and high-to-low connectivity orders.

As can be seen in FIG. 15, the order does have an effect on computational efficiency however not nearly as dramatic in the majority of these more realistic datasets compared to the simpler structures of FIG. 14. An exception is the Link dataset in which low-to-high connectivity allows HHC to run 17 times faster than lexicographical (random) order and 27 times faster than high-to-low connectivity order. For the majority of cases, running these methods with lexicographical (i.e. random) order is very robust and does not affect quality adversely but affects run time and number of CITs to a small degree.

Figure 16:
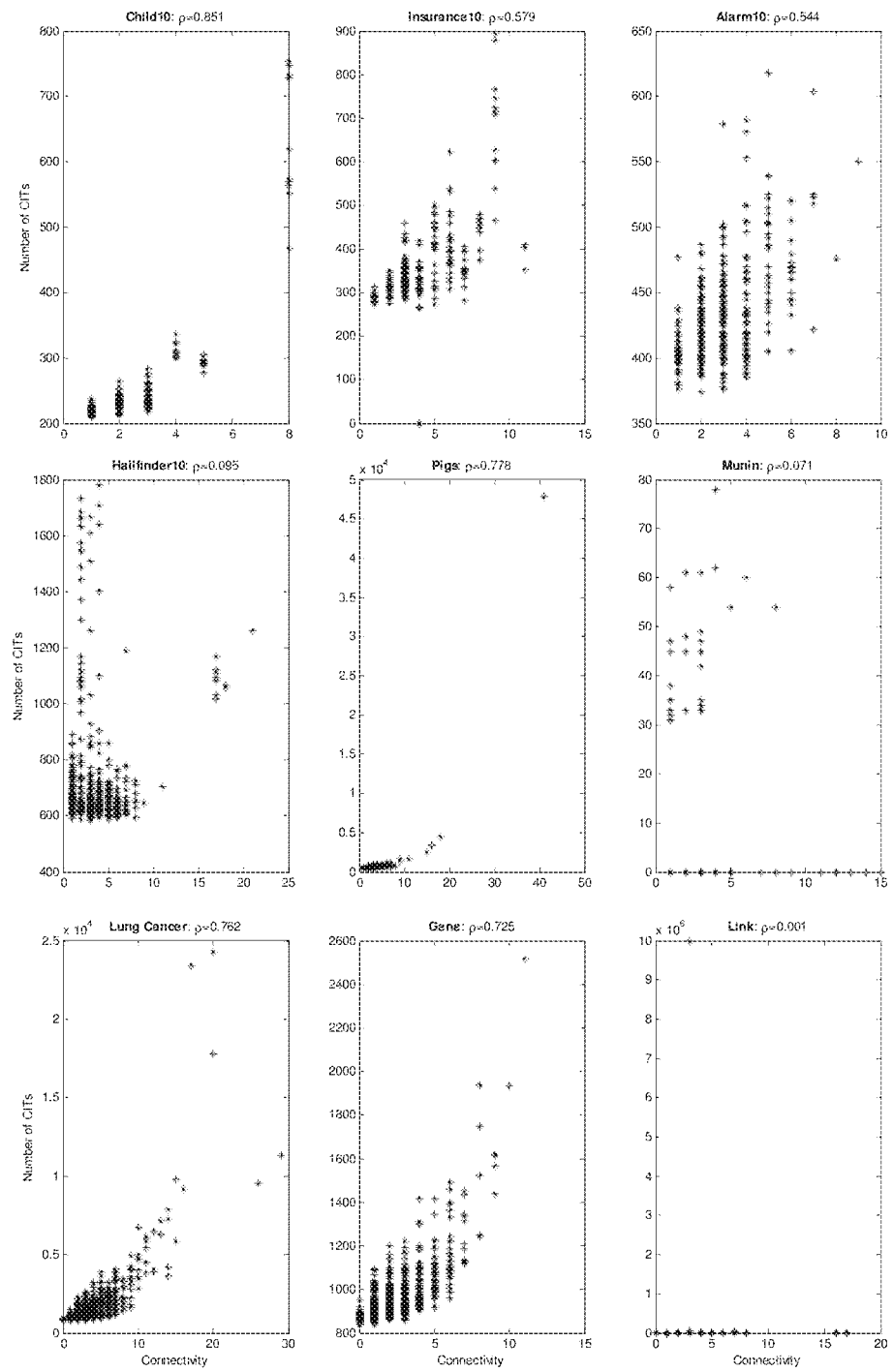
FIG. 16 shows number of CITs (conditional independence tests) versus connectivity for each of 9 datasets.
Figure 17:
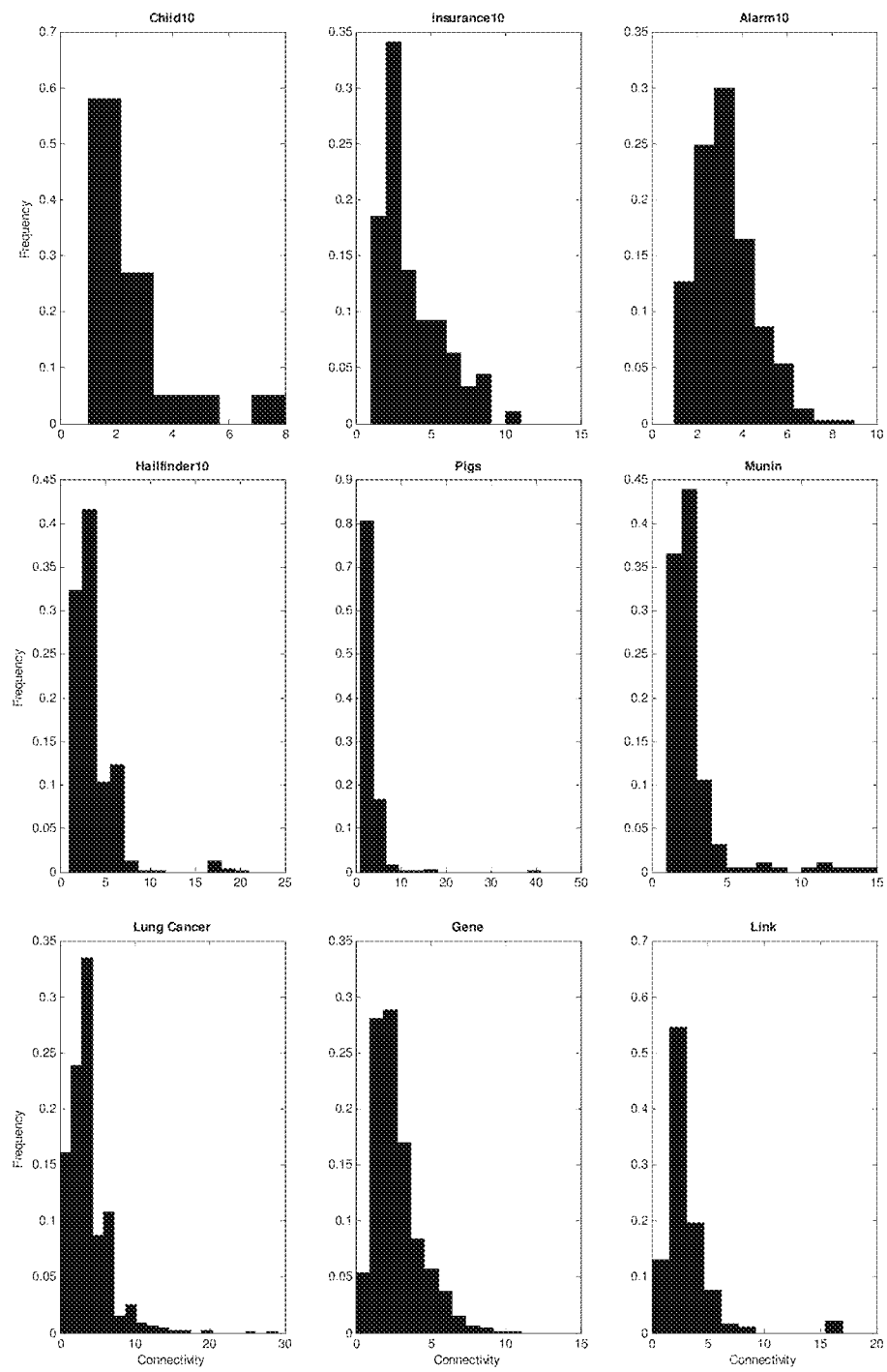
FIG. 17 shows distribution of connectivity for each of 9 datasets.

Thus, while connectivity affects which variable order is optimal in LGL methods, ranking by local connectivity does not exactly correspond to the optimal order. FIG. 16 shows the number of CITs plotted against true local connectivity in each one of the 9 datasets used in this section. Related to the above, FIG. 17 also shows the distribution of true local connectivity in each dataset. Consistent trends indicating the shape of the distributions by which the degree of local connectivity may determine an advantage of orderings low-to-high to high-to-low connectivity are not apparent in these datasets.

We hypothesized that more robust criteria for the effect of variable ordering in LGL learning can be devised. For example, the number or total cost of CITs required to locally learn the neighborhood of each variable. Such criteria are also more likely to be available or to be approximated well during practical execution of a method than true connectivity. A variant of LGL, method LGL-OO (standing for "LGL with Optimal Order") orders variables dynamically according to heuristic approximations of the total number of CITs for each variable (FIG. 4). FIG. 5 shows the general method HHC-OO. We also anticipate that in many cases the strategy for piecing together the local learning results strongly interacts with the local variable ordering to determine the tradeoff between the quality and efficiency of the LGL methods.

In recent years several researchers have proposed that because modern feature selection methods can deal with large dimensionality/small sample datasets, they could also be used to speed up or approximate large scale causal discovery (e.g., Kohane et al. use univariate feature selection to build so-called "relevance networks" [14], or hybrid methods can be employed that use feature selection as a pre-processing to build a skeleton and then an orientation method like Greedy Search in the spirit of MMHC and LGL [15]. The results of [13] contradict this postulate because they show that non-causal feature selection does not give locally correct results. However it is still conceivable that orientation-and-repair post-processing methods (e.g., with Bayesian search-and-score) can still provide a high quality final causal graph. We test this hypothesis by examining several such hybrid methods using respectively RFE, LARS-EN and UAF post-processed by Greedy Tabu Bayesian search-and-score. We use simulated datasets from 5 out of 9 Bayesian networks employed earlier in the present section. This is because the other 4 networks cannot be used for reliable training and testing of the underlying classifier since they have several variables with very unbalanced distributions. As shown in FIG. 9, the hypothesis is not corroborated by the experimental results. In particular, Greedy Search with feature selection-based skeleton, exhibits substantial drops in quality of the returned networks (measured by structural hamming distance [7]) and typically more than one order of magnitude longer running times compared to HHC with lexicographical (random) variable ordering. On the basis of these findings, which are consistent with the results in [13], we find strong evidence in favor of using principled local causal methods instead, within the frameworks of LGL.

In the remainder we describe further an evaluation of HHC-Bach (FIG. 3, implemented using GLL-PC without symmetry correction), a configuration of LGL, in gene expression microarray data for inference of gene regulatory/transcriptional networks. We additionally compare it with the best state-of-the-art comparator methods for that domain summarized in FIG. 10.

Real gold-standards and microarray datasets were obtained for both Yeast and *E. coli* (FIG. 11). The Yeast gold-standard was built by identifying the promoter sequences that are both bound by transcription factors (TFs) according to ChIP-on-chip data and conserved within the *Saccharomyces* genus [16, 17]. Binding information is essential because TFs must first bind to a gene to induce or suppress expression, while conservation information is important because true-positive TF-DNA interactions are often conserved within a genus. This study used a set of Yeast gold-standard networks that ranged from conservative to liberal. To obtain this range, networks were chosen with different ChIP-on-chip binding significance levels $\alpha=0.001$ or 0.005, and were required to have a binding sequence that is conserved in C=0, 1 or 2 of the related *Saccharomyces* species (FIG. 6). Hence, the most conservative gold-standard, YEAST(C), was built from TF-DNA interactions with $\alpha=0.001$, such that bound DNA sequence was conserved in at least 2 Yeast relatives. A compendium of 530 Yeast microarray samples was taken from the Many Microbe Microarray Database [18].

The *E. coli* gold-standard network was obtained from RegulonDB (version 6.4), a manually curated database of regulatory interactions obtained mainly through a literature search [19]. ChIP-qPCR data has shown RegulonDB to be approximately 85% complete [20]. Evidence for each regulatory interaction in RegulonDB is classified as "strong" or "weak", depending on the type of experiment used to predict the interaction. For example, binding of a TF to a promoter is considered strong evidence, whereas gene-expression based computational predictions are considered weak evidence. For the purposes of our study, we created a conservative gold-standard of only strong interactions, and a liberal gold-standard that includes both strong and weak interactions. To ensure that our results are directly comparable with the DREAM2 challenge, we also included an earlier version of the RegulonDB gold-standard. A compendium of 907 *E. coli* microarray samples was taken from the Many Microbe Microarray Database [18]. We also used gene expression data from the DREAM2 challenge that was a subset of the previous dataset.

In addition to using real gene expression data with approximate gold-standards, we also used simulated data where gold-standards are known exactly (FIG. 12). We focused here exclusively on cutting-edge simulation methods that produce artificial data that resembles real biological data.

The Resimulated Gene Expression Dataset (REGED) is based on a high-fidelity resimulation technique for generating synthetic data that is statistically indistinguishable from real expression data [21]. The REGED network was induced from 1,000 randomly selected genes in a lung cancer gene expression dataset [22]. This network displays a power-law connectivity [23] and generates data that is statistically indistinguishable from real data according to an SVM classifier [24]. Moreover, statistical dependencies and independencies are consistent between the real and synthetic data according to the Fisher's Z test. Note that the REGED dataset was used in the Causality and Prediction Challenge [21].

The GeneNetWeaver (GNW) simulation method attempts to mimic real biological data by using topology of known regulatory networks [25, 26]. Stochastic dynamics that are meant to model transcriptional regulation were applied to the extracted networks to generate simulated data.

We assessed all global network reverse-engineering methods by first computing positive predictive value (PPV) and negative predictive value (NPV). PPV measures the probability that a regulatory interaction discovered by the method exists in the gold-standard (i.e., the precision of the output graph), while NPV measures the probability that an interaction not predicted by the method does not exist in the gold-standard. Then, PPV and NPV were combined in a single metric by computing the Euclidean distance from the optimal method with PPV=1 and NPV=1: $\sqrt{(1-PPV)^2+(1-NPV)^2}$.

Implementations of HHC-Bach, regardless of parameters, constituted all of the top-five performing techniques (FIG. 13; HHC-Bach is denoted as LGL-Bach). This method output few regulatory interactions relative to the size of the gold-standard. However, a larger percentage of these were true-positive interactions than for any other method. Moreover, for most datasets >98%-99% of the regulatory interactions not predicted by HHC-Bach did not exist in the gold-standard. Such a relatively accurate list of putative interactions can be fruitful for biologists because it limits the case of experimentally validating the false-positive interactions of a reverse-engineering method. Of note, Graphical Lasso performed the best on the GNW(A), GNW(B), and ECOLI(D) datasets. However, it performed poorly on all other datasets, and therefore ranks only seventh among all methods.

ABBREVIATIONS

BDeu—Bayesian Dirichlet equivalence uniform (scoring metric)
ChIP—Chromatin immuneprecipitation (biological methodology to investigate interaction between proteins and DNA)
CIT—conditional independence test
CLR—Context likelihood of relatedness (method for discovery of global causal networks)
DAG—Directed acyclic graph
DNA—Deoxyribonucleic acid (molecule that encodes the genetic instructions)
GES—Greedy equivalence search (method for discovery of global causal networks)
GLL—Generalized local learning (method for local causal discovery)
GLL-PC—Generalized local learning parents and children (method for local causal discovery)
GNW—GeneNetWeaver (method for simulating data from gene networks)
HHC—HITON hill-climbing (method for discovery of global causal networks)
HHC-Bach—HITON hill-climbing with Bach scoring (method for discovery of global causal networks)
HHC-OO—HITON hill-climbing with optimal order (method for discovery of global causal networks)
LARS-EN—Least angle regression with elastic net (method for regression and feature selection)
LGL—Local-to-global (method for discovery of global causal networks)
LGL-Bach—Local-to-global with Bach scoring (method for discovery of global causal networks)
LGL-OO—Local-to-global with optimal order (method for discovery of global causal networks)
MMHC—Max-min hill-climbing (method for discovery of global causal networks)
NPV—Negative predictive value (graph reconstruction accuracy metric)
OR—Optimal reinsertion (method for discovery of global causal networks)
qPCR—quantitative polymerase chain reaction (methodology for measuring gene expression)
PC—Peter and Clark (method for discovery of global causal networks)
PC(X)—Parents and children set of a variable X (set of variables/nodes in the graph)
PPV—Positive predictive value (graph reconstruction accuracy metric)
REGED—Resimulated gene expression dataset (specific dataset used to test the invention)
RFE—Support vector machine recursive feature elimination (method for feature selection for classification)
SA-CLR—Synergy augmented context likelihood of relatedness (method for discovery of global causal networks)
SCA—Sparse candidate (method for discovery of global causal networks)
SHD—Structural Hamming distance (graph reconstruction accuracy metric)
SVM—Support vector machines (classification method)
TF—Transcription factor (protein that binds to specific DNA sequences)
TPC(X)—Tentative parents and children set of a variable X (set of variables/nodes in the graph)
TPDA—Three phase dependency analysis (method for discovery of global causal networks)
UAF—Univariate attribute filtering (method for feature selection for classification)

Method and System Output, Presentation, Storage, and Transmittance

The relationships, correlations, and significance (thereof) discovered by application of the method of this invention may be output as graphic displays (multidimensional as required), probability plots, linkage/pathway maps, data tables, and other methods as are well known to those skilled in the art. For instance, the structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Figure 18:
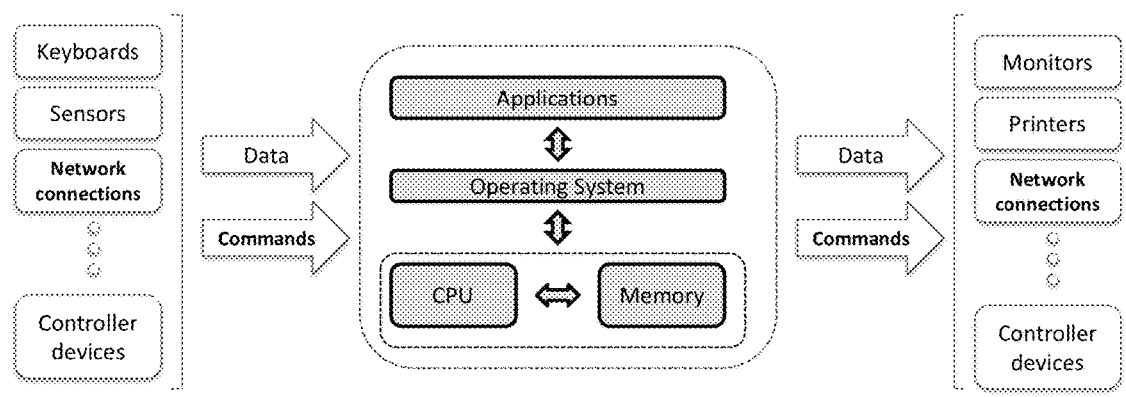
FIG. 18 shows the organization of a general-purpose modern digital computer system such as the ones used for the typical implementation of the invention.

Due to large numbers of data elements in the datasets, which the present invention is designed to analyze, the invention is best practiced by means of a general purpose digital computer with suitable software programming (i.e., hardware instruction set) (FIG. 18 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. *Gartner* (June 2012) 2012.
3. NIH Big Data to Knowledge (BD2K) [http://bd2k.nih.gov/about_bd2k.html#bigdata]

4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Friedman N, Nachman I, Pe'er D: Learning Bayesian network structure from massive datasets: the "Sparse Candidate" algorithm. *Proceedings of the Fifteenth Conference on Uncertainty in Artificial Intelligence (UAI)* 1999.
7. Tsamardinos I, Brown L E, Aliferis C F: The Max-Min Hill-Climbing Bayesian Network Structure Learning Algorithm. *Machine Learning* 2006, 65(1):31-78.
8. Chickering D M: Optimal structure identification with greedy search. *Journal of Machine Learning Research* 2003, 3(3):507-554.
9. Moore A, Wong W K: Optimal reinsertion: a new search operator for accelerated and more accurate Bayesian network structure learning. *Proceedings of the Twentieth International Conference on Machine Learning (ICML)* 2003:552-559.
10. Spirtes P, Glymour C N, Scheines R: Causation, prediction, and search, vol. 2nd. Cambridge, Mass.: MIT Press; 2000.
11. Cheng J, Greiner R: Learning Bayesian Belief Network Classifiers: Algorithms and System. *Proceedings of 14th Biennial conference of the Canadian society for computational studies of intelligence* 2001.
12. Cheng J, Greiner R, Kelly J, Bell D, Liu W: Learning Bayesian networks from data: an information-theory based approach. *Artificial Intelligence* 2002, 137(1):43-90.
13. Aliferis C F, Statnikov A, Tsamardinos I, Mani S, Koutsoukos X D: Local Causal and Markov Blanket Induction for Causal Discovery and Feature Selection for Classification. Part I: Algorithms and Empirical Evaluation. *Journal of Machine Learning Research* 2010, 11:171-234.
14. Kohane I S, Kho A T, Butte A J: Microarrays for an integrative genomics. Cambridge, Mass.: MIT Press; 2003.
15. Schmidt M, Niculescu-Mizil A, Murphy K: Learning Graphical Model Structure using L1-Regularization Paths. *Proceedings of the Twenty-Second National Conference on Artificial Intelligence (AAAI)* 2007.
16. Lee T I, Rinaldi N J, Robert F, Odom D T, Bar-Joseph Z, Gerber G K, Hannett N M, Harbison C T, Thompson C M, Simon I et al: Transcriptional regulatory networks in *Saccharomyces cerevisiae*. *Science* 2002, 298(5594):799-804.
17. MacIsaac K D, Wang T, Gordon D B, Gifford D K, Stormo G D, Fraenkel E: An improved map of conserved regulatory sites for *Saccharomyces cerevisiae*. *BMC Bioinformatics* 2006, 7:113.
18. Faith J J, Driscoll M E, Fusaro V A, Cosgrove E J, Hayete B, Juhn F S, Schneider S J, Gardner T S: Many Microbe Microarrays Database: uniformly normalized Affymetrix compendia with structured experimental metadata. *Nucleic Acids Res* 2008, 36 (Database issue): D866-D870.
19. Gama-Castro S, Jimenez-Jacinto V, Peralta-Gil M, Santos-Zavaleta A, Penaloza-Spinola M I, Contreras-Moreira B, Segura-Salazar J, Muniz-Rascado L, Martinez-Flores I, Salgado H et al: RegulonDB (version 6.0): gene regulation model of *Escherichia coli* K-12 beyond transcription, active (experimental) annotated promoters and Textpresso navigation. *Nucleic Acids Res* 2008, 36 (Database issue):D120-D124.
20. Stolovitzky G, Prill R J, Califano A: Lessons from the DREAM2 Challenges. *Ann NY Acad Sci* 2009, 1158:159-195.
21. Guyon I, Aliferis C, Cooper G, Elisseeff A, Pellet J P, Spirtes P, Statnikov A: Design and analysis of the causation and prediction challenge. *Journal of Machine Learning Research Workshop and Conference Proceedings (WCCI2008 workshop on Causality)* 2008, 3:1-33.
22. Bhattacharjee A, Richards W G, Staunton J, Li C, Monti S, Vasa P, Ladd C, Beheshti J, Bueno R, Gillette M et al: Classification of human lung carcinomas by mRNA expression profiling reveals distinct adenocarcinoma subclasses. *Proc Natl Acad Sci USA* 2001, 98(24):13790-13795.
23. Jeong H, Tombor B, Albert R, Oltvai Z N, Barabasi A L: The large-scale organization of metabolic networks. *Nature* 2000, 407(6804):651-654.
24. Vapnik V N: Statistical learning theory. New York: Wiley; 1998.
25. Marbach D, Prill R J, Schaffter T, Mattiussi C, Floreano D, Stolovitzky G: Revealing strengths and weaknesses of methods for gene network inference. *Proc Natl Acad Sci USA* 2010, 107(14):6286-6291.
26. Marbach D, Schaffter T, Mattiussi C, Floreano D: Generating realistic in silico gene networks for performance assessment of reverse engineering methods. *J Comput Biol* 2009, 16(2):229-239.
27. Buntine W: Theory refinement on Bayesian networks. In: *Proceedings of the Seventh Conference on Uncertainty in Artificial Intelligence:* 1991: Morgan Kaufmann Publishers Inc.; 1991: 52-60.
28. Bach F R, Jordan M I: Learning graphical models with Mercer kernels. *Advances in Neural Information Processing Systems (NIPS)* 2003, 15:1009-1016.
29. Basso K, Margolin A A, Stolovitzky G, Klein U, la-Favera R, Califano A: Reverse engineering of regulatory networks in human B cells. *Nat Genet* 2005, 37(4): 382-390.
30. Butte A J, Kohane I S: Mutual information relevance networks: functional genomic clustering using pairwise entropy measurements. *Pac Symp Biocomput* 2000:418-429.
31. Margolin A A, Nemenman I, Basso K, Wiggins C, Stolovitzky G, Dalla F R, Califano A: ARACNE: an algorithm for the reconstruction of gene regulatory networks in a mammalian cellular context. *Bmc Bioinformatics* 2006, 7 Suppl 1:S7.
32. Qiu P, Gentles A J, Plevritis S K: Fast calculation of pairwise mutual information for gene regulatory network reconstruction. *Comput Methods Programs Biomed* 2009, 94(2):177-180.
33. Faith J J, Hayete B, Thaden J T, Mogno I, Wierzbowski J, Cottarel G, Kasif S, Collins J J, Gardner T S: Large-scale mapping and validation of *Escherichia coli* transcriptional regulation from a compendium of expression profiles. *PLoS Biol* 2007, 5(1):e8.
34. Anderson T W: An introduction to multivariate statistical analysis, vol. 3rd. Hoboken, N.J.: Wiley-Interscience; 2003.
35. Watkinson J, Liang K C, Wang X, Zheng T, Anastassiou D: Inference of regulatory gene interactions from expression data using three-way mutual information. *Ann NY Acad Sci* 2009, 1158:302-313.

36. Bansal M, Belcastro V, Ambesi-Impiombato A, di B D: How to infer gene networks from expression profiles. *Mol Syst Biol* 2007, 3:78.
37. Eisen M B, Spellman P T, Brown P O, Botstein D: Cluster analysis and display of genome-wide expression patterns. *Proc Natl Acad Sci USA* 1998, 95(25):14863-14868.
38. Castelo R, Roverato A: Reverse engineering molecular regulatory networks from microarray data with qp-graphs. *J Comput Biol* 2009, 16(2):213-227.
39. Castelo R, Roverato A: A robust procedure for Gaussian graphical model search from microarray data with p larger than n. *Journal of Machine Learning Research* 2006, 7:2650.
40. Opgen-Rhein R, Strimmer K: From correlation to causation networks: a simple approximate learning algorithm and its application to high-dimensional plant gene expression data. *BMC Syst Biol* 2007, 1:37.
41. Friedman J, Hastie T, Tibshirani R: Sparse inverse covariance estimation with the graphical lasso. *Biostatistics* 2008, 9(3):432-441.
42. Meinshausen N, Buhlmann P: High-dimensional graphs and variable selection with the lasso. *The Annals of Statistics* 2006, 34(3):1436-1462.

We claim:

1. A computer-implemented method for global causal network discovery from a dataset, comprising the following steps:
   1) using a configuration of a Generalized Local Learning-Parents and Children (GLL-PC) method, finding a set of parents and children PC(X) for every variable X in the dataset and during this process, the variables may be ordered for learning their parents and children sets according to the following dynamic prioritization of variables process;
      a) ordering variables randomly;
      b) repeating the following steps c)-d) until GLL-PC has terminated for all variables;
      c) using GLL-PC, start learning the parents and children sets for all variables in current order;
         i) interrupting processing of a variable when the number of conditional independence tests (CIT) equal to testnum have been completed for the variable or until GLL-PC terminates for that variable;
         ii) when GLL-PC terminates or it is interrupted for the variable X, sharing the Tentative PC(X) membership results with runs of GLL-PC for all other variables by not forcing strongly relevants in the Tentative PC set of the corresponding variables to be excluded thereafter and forcing identified weakly relevants and irrelevants out of the corresponding variables not to be considered again;
      d) for each variable X, calculating a revised optimal priority score, (R) for X on the basis of;
         i) how fast GLL-PC is able to eliminate candidate causes and effects for X;
         ii) CIT results for all variables in the dataset;
         iii) the ability of X to eliminate other variables from Tentative PC sets up to the point of interrupt; and
      e) re-ranking those variables where GLL-PC has not terminated yet using their R scores, from largest to smallest;
   2) obtaining a skeleton by representing membership of variables Y in the set PC(X) as undirected edges between Y and X;
   3) orienting edges in the skeleton using any method of choice; and
   4) outputting the global causal graph.

2. A computer-implemented method for global causal network discovery from a dataset comprising the following steps:
   1) using a Semi-Interleaved HITON-PC method, finding the set of parents and children PC(X) for every variable X in the dataset, and during this process, ordering the variables for learning their parents and children sets lexicographically according to the following dynamic prioritization of variables process;
      a) order variables randomly;
      b) repeating steps c)-e) until semi-interleaved HITON-PC has terminated for all variables;
      c) using semi-interleaved HITON-PC, start learning the parents and children sets for all variables in current order;
         i) interrupting processing of a variable when a number of conditional independence tests equal to testnum have been completed for the variable or until semi-interleaved HITON-PC terminates for that variable;
         ii) when semi-interleaved HITON-PC terminates or it is interrupted for a variable, sharing the membership results with all other variables by not forcing strongly relevants in the Tentative PC set of the corresponding variables to be excluded thereafter and forcing identified weakly relevants and irrelevants out of the corresponding variables not to be considered again;
      d) for each variable X calculating a quantity R equal to the number of eliminated variables by semi-interleaved HITON-PC running on X divided by the total number of conditional independence tests employed for X; and
      e) re-ranking those variables where semi-interleaved HITON-PC has not terminated yet using their R scores, from largest to smallest;
   2) obtaining a skeleton comprising: adding an edge between X and Y if Y belongs to PC(X) or X belongs to PC(Y);
   3) orienting edges in the skeleton using any method of choice; and
   4) outputting the global causal graph.

3. The computer-implemented method of claim 1, where the following step is used in place of step 2):
   obtaining a skeleton comprising: adding an edge between X and Y if Y belongs to PC(X) and X belongs to PC(Y).

4. The computer-implemented method of claim 1, where the following step is used in place of step 1):
   using the GLL-PC method, finding the set of parents and children PC(X) for every variable X in the dataset, and during this process, ordering the variables for learning their patents and children sets lexicographically by order of their index in the dataset;
   and where the following step is used in place of step 3):
   ordering edges using greedy steepest-ascent Tabu search and Bach's score.

5. The computer-implemented method of claim 2, where the following is used in place of step 1):
   using the Semi-interleaved HITON-PC method, finding the set of parents and children PC(X) for every variable X in the dataset, and during this process ordering the variables for learning their parents and children sets lexicographically by order of their index in the dataset;
and where the following step is used in place of step 3:
 orienting edges using greedy steepest-ascent Tabu search and Bach's score.

* * * * *